PULSE GENERATOR

Filed Feb. 24, 1955

INVENTOR:
Eric R. Woods
BY
Thaddeus J. Jason
ATTORNEY

United States Patent Office 2,871,355

Patented Jan. 27, 1959

2,871,355

PULSE GENERATOR

Eric Robert Woods, San Diego, Calif., assignor to General Dynamics Corporation, San Diego, Calif., a corporation of Delaware Application February 24, 1955, Serial No. 490,252

1 Claim. (Cl. 250—36)

Figure 1:
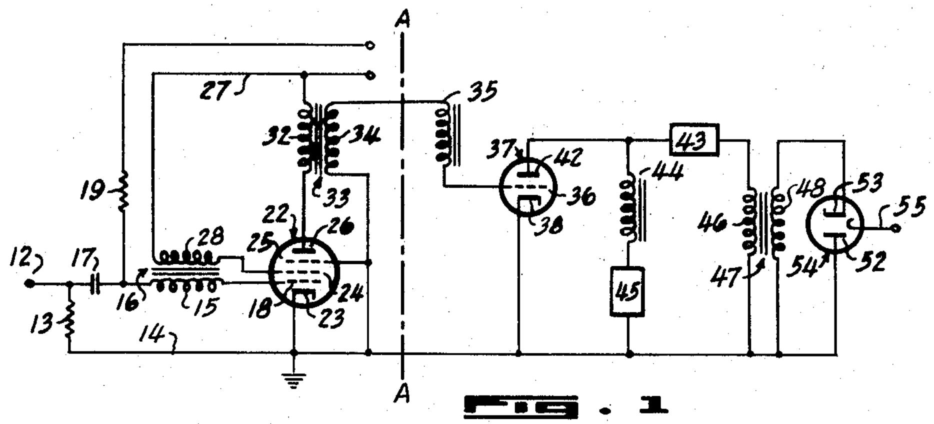

This invention relates to electrical circuits and more particularly to pulse generator circuits capable of being triggered by a relatively low voltage trigger pulse to produce reliable high power output pulses.

Pulse modulators generally serve to control the radio frequency energy produced in the pulses generated by high power oscillators, such as magnetrons. The modulator often includes a pulse-forming network resembling an artificial transmission line which serves to form the high power pulse. This pulse-forming network is generally discharged through some form of switching device that is closed at the beginning of the pulse and opened at the end thereof to allow storage elements of the network to be recharged. In magnetron oscillators the relationship between the modulator output pulse applied thereto and the radio frequency energy generated is quite critical and, hence, rigid requirements are placed upon both the artificial line and the switch. The firing time of the switch must be capable of being accurately controlled, the switch must have the ability to conduct large currents, and the voltage drop appearing across the switch must be low. In a great many applications a hydrogen thyratron tube is utilized as the switching device, and in order to suitably trigger this tube, it is necessary to apply a pulse to the grid electrode which will drive the grid sufficiently positive to have the tube draw grid current. The voltage required to initiate conduction between grid and cathode, as well as the time delay before conduction starts, is dependent upon the rate of rise of the applied grid voltage pulse. When conduction has been established and the grid to cathode area has become ionized, the anode-grid space breaks down with a relatively short delay. In precisely timed pulse modulation systems jitter and variations in plate ionization delay should be minimized. In order to speed grid-cathode breakdown and thereby minimize jitter, a relatively high voltage, on the order of 300 volts, is applied to the grid electrode. Furthermore, once grid ionization occurs, grid current of a substantial magnitude must be maintained to stabilize plate ionization. Also, the amplitude of the pulse applied to the grid must be stable for the duration of the pulse developed by the pulse forming network, which may be several microseconds in length. Thus, it becomes apparent that a relatively high voltage, high current pulse must be supplied from a low impedance source.

Heretofore, one approach has been to utilize small thyratron tubes to trigger the larger thyratron switching tube associated with the pulse forming line. However, the small thyratron tubes are not only often quite critical concerning the input waveform but are also highly temperature sensitive, which is an undesirable characteristic in airborne equipment. Furthermore, when two thyratrons are connected in cascade, jitter and time delay problems are magnified.

Another approach has been to use a conventional blocking oscillator circuit as a regenerative trigger generator for the switching tube. While the blocking oscillator is more reliable and does not have the objectionable waveshape, jitter, and temperature characteristics of the thyratron trigger circuit, it does have the inherent disadvantage of being unable to supply the power required to fire a large thyratron and, additionally, has high output impedance. The disadvantages of the blocking oscillator may be overcome by the addition of a power amplifier stage. However, an additional power amplifier stage has the disadvantage of requiring an extra vacuum tube and associated circuit elements, thus increasing weight, size, power requirements, and consequently complexity and cost.

Accordingly, the present invention includes basically a vacuum tube circuit which develops its own switching action by regeneratively connecting a pair of grid electrodes of a multigrid electron tube to form a switching circuit which is coupled to the output elements of the circuit only through the electron stream of the tube.

It is, therefore, an object of the present invention to provide a pulse generator for producing stable high power pulses.

Another object of the present invention is to provide a pulse generator for producing standardized output pulses irrespective of the waveshape or amplitude of the triggering pulses applied thereto.

A further object of the present invention is to provide a small and compact pulse generator which produces output pulses which are substantially independent of output load.

Still another object of the present invention is to provide a pulse generator capable of producing high peak plate currents, in response to small triggering signals, for a predetermined pulse period which is independent of load characteristics.

Another object of this invention is to provide a high power output pulse generator wherein the output load is coupled only by an electron stream.

Figure 2:
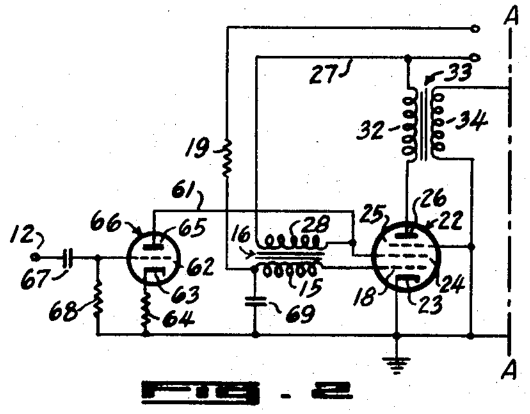
Figure 4:
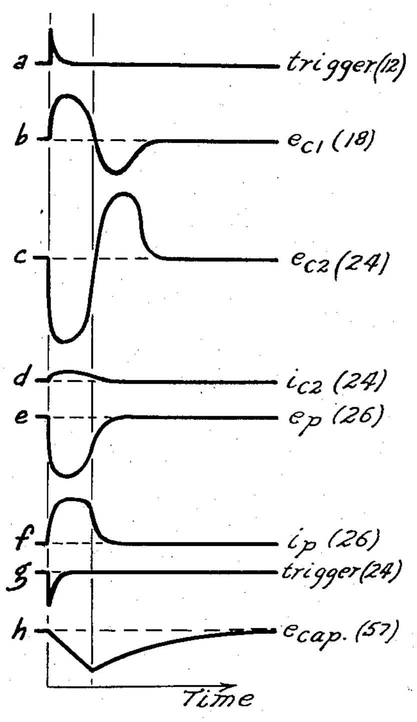
Figure 3:
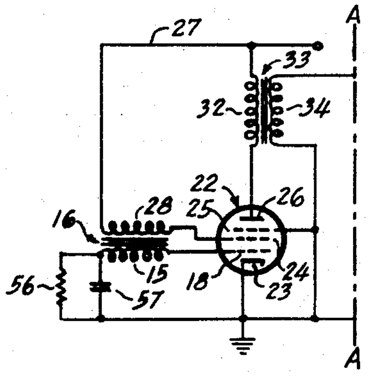

Other objects and features of this invention will be readily apparent to those skilled in the art from the following specification and appended drawing illustrating certain preferred embodiments of this invention in which:

Figure 1 is a schematic diagram of one embodiment of the invention, together with circuits with which the invention may be utilized, Figure 2 is a schematic diagram illustrating another embodiment of the invention, Figure 3 is a schematic diagram illustrating still another embodiment of the invention, and Figure 4(*a*) illustrates the waveform of a trigger pulse which may be applied to input terminal 12, Figure 4(*b*) illustrates the voltage waveform appearing at the first control electrode 18.

Figure 4(*c*) illustrates the voltage waveform appearing at the second control electrode 24, Figure 4(*d*) shows the waveform of the space current flowing to the second control electrode 24, Figure 4(*e*) illustrates the voltage waveform appearing at the anode 26, Figure 4(*f*) illustrates the waveform of the anode current flowing in electron tube 22, Figure 4(*g*) illustrates an input trigger pulse which may be applied to the second control electrode 24, and Figure 4(*h*) illustrates the voltage waveform across the timing capacitor in the free-running pulse generator shown in Figure 3.

Referring now to Figure 1, a suitable trigger pulse, of the form illustrated by Figure 4(*a*), is applied to an input terminal 12 and across input resistor 13, which is connected between input terminal 12 and ground bus 14. Secondary winding 15 of a suitable pulse transformer 16 is connected in series relation between a blocking capacitor 17 and first control electrode 18 of electron discharge device 22. In addition to control electrode 18, electron discharge device 22 may include a cathode 23, a plurality of additional electron-stream-controlling electrodes including a second control electrode 24, suppressor electrode 25, and an anode 26. First control electrode 18 is supplied with a negative biasing potential through secondary winding 15 of transformer 16, and resistor 19, by a suitable negative voltage source (not shown). Cathode 23 and suppressor electrode 25 are held at ground potential by conductive connection to ground bus 14. Second control electrode 24 is connected to a suitable positive voltage source (not shown) through high voltage bus 27 and primary winding 28 of pulse transformer 16. Anode 26 is connected to said positive voltage source through primary winding 32 of pulse transformer 33 and high-voltage bus 27. Secondary winding 34 of transformer 33 is connected between ground bus 14 and a suitable output device through choke coil 35. Illustratively, such an output device may be a magnetron modulator of a type well known to those skilled in the art. Pulses generated by this invention may be furnished to said magnetron modulator by means of secondary winding 34 of transformer 33, which is connected through choke 35 to the control electrode 36 of a suitable high power hydrogen thyratron 37. Thyratron 37, in addition, has a cathode 38 connected to ground bus 14, and an anode 42 connected to a pulse-forming network 43 of a type well known in the art, and through choke coil 44 to one side of an additional high voltage power supply 45 of a form well-known to those skilled in the art. The other side of said additional power supply 45 is maintained at ground potential by connection to ground bus 14. Pulse-forming network 43 may be connected in series relationship with primary winding 46 of a pulse transformer 47. Said series circuit is further connected in parallel relationship with a second series circuit consisting of aforementioned choke 44 and high-voltage power supply 45. Secondary winding 48 of pulse transformer 47 is connected across a magnetron oscillator, shown schematically at 52, containing a cathode 53, an anode 54 and radio frequency power output lead 55. Anode 54 is held at ground potential by connection to ground bus 14, while cathode 53 is connected to secondary winding 48 of pulse transformer 47.

As in the conventional blocking oscillator, well known in the art, this invention may be free running or require an external trigger, depending upon the magnitude of negative bias voltage applied to control electrode 18. In the embodiment herein illustrated by Figure 1, this invention may be triggered by applying a positive pulse, illustrated by Figure 4($a$), to input terminal 12. In the embodiment illustrated in Figure 1, discharge device 22 is normally non-conducting since first control electrode 18 is connected through secondary winding 15 of transformer 16 and resistor 19 to a negative voltage bias supply, not shown. The trigger pulse illustrated by Figure 4($a$) is applied across input resistor 13 to series blocking capacitor 17, series winding 15 of pulse transformer 16 and thence to first control electrode 18. The amplitude of the trigger pulse is of a magnitude sufficient to overcome the negative bias voltage and start conduction in discharge device 22. Since second control electrode 24 is normally maintained at a high positive potential, a portion of the space current which is illustrated by Figure 4($d$), flows to second control electrode 24, and through primary winding 28 of transformer 16 to bus 27. As a result of the direction of increase of current flow in transformer winding 28, a voltage is induced in secondary winding 15 of such a polarity as to drive first control electrode 18 more positive, thereby aiding the effect of the input pulse, as illustrated by Figure 4($b$). The resultant regenerative increase in space current is cumulative, driving first control electrode 18 rapidly to a high positive potential substantially instantly after space current begins to flow in discharge device 22, in the manner illustrated by Figure 4($b$). While second control electrode 24 is driven less positive, due to the polarity of the voltage induced in transformer 16, in the manner shown in Figure 4($c$), it remains at a potential sufficient to permit sufficient current to flow. Transformer 16 is so designed as to maintain the potential of second control electrode 24 within normal operating limits. It will be seen, therefore, that space current increases very rapidly to the saturation point of discharge device 22, whereupon space current becomes stable. At the saturation point, current flow through primary winding 28, shown by Figure 4($d$), stops increasing, thus no longer inducing a positive voltage in the end of secondary winding 15 connected to first control electrode 18, as shown in Figure 4($b$). The negative voltage induced in the other end of winding 15 by the increasing space current had previously charged capacitor 17 negatively in the manner illustrated by Figure 4($h$), said negative voltage now being applied through winding 15 to first control electrode 18. Thus, control electrode 18 becomes negative, thereby reducing space current. As current through primary winding 28 of transformer 16 decreases in the manner shown by Figure 4($d$), a negative voltage is induced at the end of secondary winding 15 connected to first control electrode 18, as illustrated by Figure 4($b$), driving first control electrode 18 further in the negative direction. The decrease in space current due to this regenerative action drives electron discharge device 22 to the cutoff point very rapidly, resulting in a sharp cutoff of anode current, as shown by Figure 4($f$).

From the foregoing, it will be clear that substantially all of the pulse of space current generated by the blocking oscillator action of cathode 23, first control electrode 18, second control electrode 24 and their associated circuits is acquired by anode 26, resulting in a negative voltage pulse at anode 26, as illustrated by Figure 4($e$). It will be seen that the virtual triode blocking oscillator formed by cathode 23, first control electrode 18 and second control electrode 24 is coupled by the electron stream to anode 26. The pulse of anode current so generated, illustrated by Figure 4($f$), passes through primary winding 32 of pulse transformer 33, thereby inducing a positive polarity pulse in secondary winding 34. Control electrode 36 of thyratron 37 receives the induced positive pulse, initiating conduction through thyratron 37 in a manner well known to those skilled in the art. Pulse forming network 43, previously having been charged to a potential of several kilovolts by power supply 45, is discharged through a series circuit comprising conducting thyratron 37, ground bus 14 and primary winding 46 of pulse transformer 47. A very high voltage negative pulse is thereby induced in secondary winding 48 of pulse transformer 47 and applied to cathode 53 of magnetron 54. Magnetron 54 oscillates at a microwave frequency during the period high negative potential is applied to cathode 53 in a manner well known in the art, thereby furnishing a pulse of microwave oscillations at RF output line 55.

Choke coil 35, in circuit between transformer 33 and control electrode 36 of thyratron 37, is furnished for the purpose of reducing the large initial transient flow of ionization current from control electrode 36 to pulse transformer 33. Choke coil 44 in series with power supply 45, serves to prevent the flow of transient pulse current from pulse forming network 43 through high-voltage power supply 45, while simultaneously allowing pulse-forming network 43 to be charged by power supply 45.

Figure 2 illustrates a second embodiment of the present invention. In this embodiment, an electron discharge device 66, not part of the invention, is illustrated. Electron discharge device 66 may be a pulse amplifier or may be half of a multivibrator. Electron discharge device 66 merely serves to provide a negative trigger pulse to the embodiment of this invention illustrated by Figure 2. In the embodiment illustrated, assuming discharge device 66 is employed as a pulse amplifier, a positive input pulse is applied to input terminal 12, through blocking capacitor 67, across grid resistor 68 and finally to control electrode 62 of electron discharge device 66. In addition to control electrode 62, electron discharge device 66 will contain at least a cathode 63 and an anode 65. Cathode 63 is connected to ground bus 14 through bias resistor 64. Anode 65 is connected to second control electrode 24 of electron discharge device 22 by means of lead 61. Electron discharge device 22 is similar in structure and function to the device disclosed hereinabove in connection with Figure 1, similar parts being similarly identified. Second control electrode 24 is connected to a suitable power supply, not shown, through high voltage bus 27 and primary winding 28 of pulse transformer 16. First control electrode 18 is connected through secondary winding 15 of transformer 16 and grid resistor 19 to a suitable source of negative bias voltage (not shown). Capacitor 69 is connected between the junction of resistor 19 and secondary winding 15 of transformer 16 and ground bus 14. Cathode 23 is maintained at ground potential by connection to ground bus 14. Anode 26 is supplied with a suitable positive potential from a power source, not shown, by connection through primary winding 32 of pulse transformer 33 to high-voltage supply bus 27. Suppressor electrode 25 is held at ground potential by connection to ground bus 14. One terminal of secondary winding 34 of transformer 33 is connected to ground bus 14 while the other terminal is connected to utilization device, such as thyratron 37 of the magnetron modulator circuit illustrated to the right of A—A in Figure 1.

The operation of the circuit illustrated by Figure 2 is somewhat similar to that shown in Figure 1. A positive trigger pulse, illustrated by Figure 4(*a*), is applied to input terminal 12, through blocking capacitor 67, across grid resistor 68 to control electrode 62 of electron discharge device 66. Discharge device 66, operated as a pulse amplifier and inverter stage, has cathode 63 maintained at a slightly positive potential with respect to control electrode 62 by means of cathode bias resistor 64, thereby keeping control electrode 62 at the proper operating point, in a fashion well known to those skilled in the art. Anode voltage for anode 65 is supplied by a power source (not shown) through conductor 61, primary winding 28 of transformer 16, and high-voltage bus 27. Thus, as control electrode 62 is raised in potential by the input pulse, space current will flow through winding 28 of transformer 16, which winding also serves as a load impedance for discharge device 66. The voltage drop across the impedance of winding 28 results in an amplified negative voltage pulse, illustrated by Figure 4(*g*), applied to second control electrode 24. By the transformer action disclosed hereinabove in connection with Figure 1, a positive voltage is induced by secondary winding 15 of pulse transformer 16 at first control electrode 18, thereby driving control electrode 18 positive, in the manner illustrated by the waveform of Figure 4(*b*). As disclosed hereinabove in connection with the embodiment of Figure 1, the potential of second control electrode 24 becomes less positive as first control electrode 18 becomes more positive, as illustrated by Figure 4(*b*) and Figure 4(*c*). As first control electrode 18 is driven more positive, space current increases to the saturation point in the manner disclosed hereinabove in connection with Figure 1. Thus, current from second control electrode 24 flows through primary winding 28 of transformer 16, in a manner inducing a positive potential at first control electrode 18 which is shown by Figure 4(*b*). The positive potential on first control electrode 18 causes space current to increase until the saturation point of discharge device 22 is reached. At the saturation point, current no longer increases, whereupon the induced positive voltage is no longer applied to first control electrode 18. At this point, the potential at first control electrode 18 is decreased, as illustrated by Figure 4(*b*), due to the negative potential charge on capacitor 69, previously negatively charged by the voltage induced by transformer 16. Thereby, the quantity of space current decreases, and, therefore, the current to second control electrode 24 is reduced. As the current in primary winding 28 decreases, in the manner shown by Figure 4(*d*), the direction of current change in winding 28 of transformer 16 induces a negative voltage at the end of secondary winding 15 connected to first control electrode 18, as shown in Figure 4(*b*), further reducing space current. Reduction of space current to zero is sharply accomplished by the regenerative cut-off action hereinabove disclosed in connection with Figure 1.

The blocking oscillator circuit illustrated in Figure 2 is more sensitive than the blocking oscillator illustrated in Figure 1. In the circuit of Figure 1, the input pulse, when going through secondary winding 15, induces a positive voltage on second control electrode 24 opposing the drop in voltage at second control electrode 24 current flows through primary winding 28. As will be apparent, the negative pulse applied to the second control electrode 24 in the embodiment of Figure 2 aids, rather than opposes, the potential impressed upon electrode 24 by the inductive action of transformer 16, thereby making the embodiment illustrated by Figure 2 more sensitive, thus requiring lower amplitude trigger pulses. However, negative polarity pulses are required. Such negative pulses may be provided by a multivibrator, or a phase-inverting amplifier stage may be provided, as illustrated in Figure 2.

Referring again to Figure 2, the blocking oscillator circuit is electron coupled to the load circuit owing to the attribute of the circuit whereby only a small proportion of space current of discharge device 22 is utilized in the blocking oscillator action of the virtual triode formed by cathode 23, first control electrode 18, and second control electrode 24. Substantially all of the pulse generated by the virtual triode is electron-stream coupled to anode 26 and passed through primary winding 32 of pulse transformer 37 to high voltage bus 27. The pulse induced by transformer action of the anode current in secondary winding 34 is applied through choke coil 35 to control electrode 36 of a three electrode hydrogen thyratron 37, illustrated to the right of line A—A in Figure 1, thereby ionizing said thyratron to its conducting state. Choke coil 35 prevents the initial transient grid current from being applied across winding 34 of transformer 33, as discussed in connection with Figure 1.

As thyratron 37 becomes conductive, pulse forming network 43 is discharged through the circuit composed of primary winding 46 of pulse transformer 47, ground bus 14, and thyratron 37. Pulse forming network 43 is charged by high voltage power supply 45, and during discharge, generates a rectangular pulse. Secondary winding 48 of pulse transformer 47 has induced in it a high negative voltage pulse which is applied to cathode 57 of magnetron 52. As explained hereinabove in connection with Figure 1, magnetron 52 will oscillate at microwave frequencies when a sufficiently high voltage is applied to cathode 53. Thus, a burst of microwave energy is obtained at output 55 initiated by input pulse for a period established by pulse-forming network 43. The magnetron modulator illustrated to the right of A—A in Figure 1 forms no part of the present invention, being merely illustrative of a possible application of this invention.

Figure 3 illustrates a further embodiment of this invention, comprising a free-running pulse generator. Electron discharge device 22 contains an anode 26, a cathode 23, first control electrode 18, second control electrode 24, and suppressor electrode 25. Anode 26, suppressor electrode 25, second control electrode 24, cathode 23, transformer 16 and transformer 33 are arranged as described hereinabove in connection with Figures 1 and 2. In addition, a resistor 56 is connected between one end of secondary winding 15 of transformer 16, and ground bus 14. Moreover, a capacitor 57 is provided in parallel relationship with aforementioned resistor 56.

The operation of this embodiment is similar to the operation of the embodiments of this invention disclosed hereinabove in connection with Figures 1 and 2. Assuming capacitor 57 has been negatively charged by a previous cycle, in a manner to be disclosed hereinbelow, first control electrode 18 will be sufficiently below ground potential to cut off tube 22. As capacitor 57 discharges through resistor 56, in the manner illustrated by Figure 4(*h*), the potential of first control electrode 18 will be raised sufficiently to allow discharge device 22 to begin to conduct. Second control electrode 24 intercepts some of the flow of space current. The current to said second control electrode 24 passes through primary winding 28 of transformer 16. A positive voltage is induced at the end of secondary winding 15 of transformer 16 connected to first control electrode 18, and the negative voltage induced at the other end is employed to charge capacitor 57. The positive voltage on first control electrode 18 serves to increase the flow of space current. Space current increases regeneratively until the saturation point of electron discharge device 22 is reached. During the period of increasing space current a negative charge is placed on capacitor 57. The negative charge on capacitor 57 places a negative potential upon first control electrode 18 when current in transformer 16 stops increasing due to saturation of discharge device 22. As a result of the negative potential applied to first control electrode 18, discharge device 22 begins to be driven to its cut-off condition in a manner similar to that disclosed hereinabove in connection with the embodiments of this invention illustrated by Figures 1 and 2. However, in this embodiment, the negative charge on capacitor 57 replaces the negative bias voltage applied to first control electrode 18 in Figures 1 and 2. As current through primary winding 28 of transformer 16 decreases, a negative voltage is induced at the end of secondary winding 15 connected to first control electrode 18, driving it even more negative, and thereby driving tube 22 to the cut-off condition. The time constant of the combination of capacitor 57 and resistor 56 may be chosen such that the negative voltage charge on capacitor 57 will discharge through resistor 56 slowly, thereby maintaining control electrode 18 of tube 22 below cutoff for a considerable period of time, thus establishing the desired pulse repetition rate. A variable pulse repetition rate may be obtained by making resistor 56 variable, thereby varying the time constant of the resistor 56-capacitor 57 combination.

The resultant series of pulses induced in transformer 33 may be applied to a suitable utilization circuit, which may be a magnetron modulator of the form disclosed to the right of line A—A in Figure 1. As will appear obvious to one skilled in the art, this invention is not limited to use therewith, but may be used wherever a stable, high voltage, high current source of pulses is required.

As has been disclosed hereinabove, a blocking oscillator circuit utilizing the cathode and first and second control electrodes of a multi-electrode electron discharge device as the generating elements and coupling the pulsed oscillations thus generated to the anode by means of the electron stream results in many advantages. The output pulse duration at transformer 33 is substantially independent of load conditions, input trigger waveforms, and input trigger pulse amplitude. Output pulse duration in the embodiment illustrated by Figure 1 is dependent upon the design of transformer 16 and the values of capacitor 17 and resistor 19, as in blocking oscillator circuits heretofore known to the art. In the embodiment of Figure 2, output pulse duration is dependent upon the values capacitor 69 and resistor 19 in addition to transformer 16. The third embodiment of this invention illustrated by Figure 3, illustrates a free-running form of this invention, producing a repetitive train of output pulses.

As will appear obvious to one skilled in the art, the pulses at transformer 33 may be used to trigger a generator or to pulse modulate directly a klystron or small magnetron. The various embodiments of this invention discussed above in relation to Figures 1, 2 and 3 illustrate merely one of the many possible environments of this invention, namely, modulating a large, high power magnetron oscillator through a hydrogen thyratron modulating circuit. However, this invention is obviously not limited to use therewith. Many other variations of this invention are possible without departing from the scope thereof. Thus, all matter contained in the above description and in the accompanying drawings shall be interpreted as illustrative only. The scope of this invention is defined only in the appended claim.

What is claimed is:

A pulse generator for supplying a power pulse comprising a discharge device including an anode, a cathode, a suppressor electrode, a first control electrode adjacent said cathode and a second control electrode positioned between said first control electrode and said suppressor electrode, negative potential means for applying a negative potential to said first control electrode, a first pulse transformer having a secondary winding connected in serial relationship with said first control electrode, a first resistor, and said negative potential means, a capacitor and a second resistor connected in serial relationship between said cathode and the junction of said first resistor and said secondary winding, means connected between said second resistor and said capacitor for applying a positive polarity trigger pulse, positive potential means, a primary winding on said first pulse transformer tightly coupled to said secondary winding, said primary winding serially connected between said second control electrode and said positive potential means, a second pulse transformer having a primary winding connected between said positive potential means and said anode and a secondary winding having a first terminal connected to said suppressor electrode and to said cathode, and power pulse output means connected to the second terminal of said second pulse transformer secondary winding.

References Cited in the file of this patent

UNITED STATES PATENTS

| | | |
|---|---|---|
| 2,292,835 | Hepp | Aug. 11, 1942 |
| 2,303,924 | Faudell | Dec. 1, 1942 |
| 2,435,262 | Wurmser | Feb. 3, 1948 |
| 2,544,213 | Bennett et al. | Mar. 6, 1951 |
| 2,553,360 | Court | May 15, 1951 |
| 2,586,310 | Dill | Feb. 19, 1952 |

OTHER REFERENCES

Article "Blocking Oscillator Amplitude Control," page 439 of Electronic Engineering for November 1951.